United States Patent [19]

Thorn, Jr. et al.

[11] 4,054,464

[45] Oct. 18, 1977

[54] METHOD FOR MAKING CEMENT USING ARAGONITE

[75] Inventors: Ernest B. Thorn, Jr.; Charles W. Grube; Walter W. Rowe, all of Dallas; Johann A. Schüeler, Richardson, all of Tex.

[73] Assignee: General Portland, Inc., Dallas, Tex.

[21] Appl. No.: 706,942

[22] Filed: July 20, 1976

[51] Int. Cl.$^2$ ............................................. C04B 7/38
[52] U.S. Cl. ................................................. 106/100
[58] Field of Search ........................... 106/100, 104

[56] References Cited

U.S. PATENT DOCUMENTS 3,686,372  8/1972  Hiatt et al. ..................... 106/100

Primary Examiner—J. Poer
Attorney, Agent, or Firm—Richards, Harris & Medlock

[57] ABSTRACT

An improved process for making cement wherein aragonite, a natural orthorombic crystalline form of calcium carbonate, is employed in a substantially dry, naturally recovered, unprocessed state as the calcium carbonate constituent. The raw kiln feed of the aragonite and argillaceous materials can be introduced into the kiln together and/or separately to produce the desired raw kiln clinker feed within the kiln. The argillaceous material employed can be in a substantially dry state or can be present as an aqueous slurry.

12 Claims, No Drawings

METHOD FOR MAKING CEMENT USING ARAGONITE

BACKGROUND OF THE INVENTION

This invention relates to an improved process for making cement, more particularly to an improved process for producing Portland cement clinker for use in the production of cement. In one aspect, the present invention relates to an improved process for making Portland cement clinker using substantially dry, naturally recovered, unprocessed aragonite as the calcareous material employed to produce Portland cement clinker. In yet another aspect, the invention relates to an improved method for producing Portland cement clinker employing substantially dry, naturally recovered, unprocessed aragonite as the calcareous reactant material and a substantially dry argillaceous material, wherein the argillaceous material is selected from the group consisting of clay, kaolin, shale, slag, fly ash and mixtures of same.

Portland cement has heretofore been made by intergrinding combinations of calcareous materials such as calcitic limestone, oyster shell, aragonite, and an argillaceous material, such as clay, shale, slag, fly ash and other reactant materials such as silica sand. These pulverized materials are carefully blended by one of many methods and the blend or mix is then fed dry or as an aqueous slurry into a rotary kiln. Much work and energy is expended to establish the important physical and chemical parameters of the raw kiln feed prior to introducing them into a rotary kiln. Typically about one-third of the total electrical energy required to manufacture Portland cement is expended in the initial blending and grinding of the raw feed constituents. The kiln burns or reacts these materials at temperatures around 2700° F to form Portland cement clinker. As the clinker exits from the kiln, it can be quenched, if desired, for example, by a stream of air or steam or by immersion in water. The clinker so formed is then interground with predetermined amounts of calcium sulfate or other set controlling agents ground to a finely divided powder. In addition to calcium sulfate or other set controlling agents, this powder is composed of compounds of lime, alumina, silica and iron oxide as tetracalciumaluminoferrite, tricalciumaluminate, tricalciumsilicate and dicalciumsilicate. Small amounts of other materials such as magnesia, sodium, potassium and sulfur and other trace elements are also present in the combined form. The powder thus formed is generally known as Portland cement, and has the property of hardening slowly when mixed into a paste with water. The set time of Portland cement can be controlled by varying the amount of calcium sulfate or other set controlling agents.

In the production of cement from such prior art processes, it has generally been the practice to finely grind the reactant material and thoroughly blend it before being fed to a kiln for burning. Such materials can be ground and blended by either dry or wet grinding methods.

Recently, new methods of producing cement wherein aragonite is employed as the calcareous component have been set forth. Typical of such processes is that disclosed in U.S. Pat. No. 3,686,372, entitled "Method For Making Cement" wherein aragonite is disclosed as the calcareous component of the reactant mixture for the production of Portland cement. When using the process of the before mentioned patent, aragonite can be ground to a lesser fineness than required for conventional calcareous materials, such as limestone or oyster shells, or the aragonite can be screened to remove coarse particles, so that the recovered finer particles can be used without grinding. However, this process employs conventional grinding and blending methods. Thus, heretofore, when employing aragonite as the calcareous material, expense has been incurred in the grinding and blending of the aragonite, even though the aragonite is normally ground to a lesser degree of fineness than the previously known calcareous materials and/or additional separating steps are employed for removing coarse aragonite particles. The grinding operation and the screening or other appropriate methods for removing the coarse aragonite as well as the blending of said aragonite with the argillaceous portion of the mix are time consuming and expensive. It is therefore desirable to reduce, and if possible, eliminate the costs of grinding and separating fractions as well as the blending of the calcareous component of the reaction mixture for the production of cement clinker, even when using aragonite as such materials. Such would significantly reduce the power requirements for processing of the calcareous component and would eliminate the capital investment and operating expense required for grinding equipment, screens, sieves and other separating equipment and shakers, as well as for blending, storage and transporting.

SUMMARY OF THE INVENTION

It has now been discovered that aragonite can be employed as the calcareous component of the reaction mixture for Portland cement clinker and that the oolitic aragonite need not be mechanically treated to reduce the particle size or to separate coarse particles prior to introducing the aragonite into the kiln.

Thus, the present invention provides an improved process for producing Portland cement clinker using aragonite as the calcium carbonate constituent of the raw kiln feed consisting typically of from about 70 to about 80 weight percent solids content of substantially dry naturally recovered, unprocessed aragonite and from about 30 to about 20 weight percent solids content of argillaceous materials (these ratios can change depending upon the calcining content of the argillaceous materials that are used), and thereafter burning the kiln feed to produce a Portland cement clinker having an uncombined (free) lime content of less than about 2 percent.

In this improved process it is not necessary to blend the materials used prior to entry in the kiln. This blending is achieved solely by the mechanical action of the kiln, added by the following phenomena:

Aragonite, under the influence of heat and at a temperature of approximately 520° C changes its crystalline structure and converts to calcite. The associated change in volume caused by going from a higher specific gravity (2.95) to the lower specific gravity (2.71) of calcite, softens the material so that by physical action (physical action within the material and physical action as the material tumbles within a rotary kiln), and chemical action, the material breaks down in significantly smaller particles, allowing the proper cement clinkering reactions to occur.

The aragonite and argillaceous materials can be introduced into the kiln simultaneously as a single stream or each of the components can be introduced separately but substantially simultaneously into the kiln at rates sufficient to produce, in situ, the desired kiln feed. Further, the argillaceous material employed in the process of the present invention can be in the form of an aqueous slurry or as a completely dry matter.

DESCRIPTION OF PREFERRED EMBODIMENTS

As previously stated, aragonite has been employed in the manufacture of cement heretofore. However, prior attempts to use the aragonite have required mechanical treatment of the aragonite by either separating the coarser particles of the aragonite or grinding the aragonite to a certain degree of fineness.

Aragonite, a natural orthorombic crystalline form of calcium carbonate, occurs most commonly in beds of gypsum and of iron ore. One form of aragonite known as oolitic aragonite occurs on the ocean floor throughout the world. We have used that formed in the Caribbean. Oolitic aragonite occurs in discrete grains which are essentially spherical in form, and hence the name oolitic aragonite. The material as a marine deposit is unconsolidated and varies in grain size with varying amounts of shell fragments intermixed therein. Aragonite differs from calcite, the naturally occurring form of calcium carbonate in limestone, in that is has an orthorombic crystalline structure, a greater density (2.93 to 2.95 as compared to 2.71 for calcite), and less distinct cleavage than has calcite.

In the recovering of aragonite from the ocean floor, the aragonite is first dredged or otherwise removed from the ocean floor. The aragonite so recovered include various sizes of material. As previously stated, when employing such aragonite, it has heretofore been thought necessarily that same must be properly sized prior to using the aragonite in the production of Portland cement clinker.

Since this invention is primarily concerned with the use of substantially dry, naturally recovered, unprocessed aragonite as a source of calcium carbonate for the reaction mixture to be introduced into a rotary kiln or reaction system, it is to be understood that any variety of other materials normally used as reactants for the production of Portland cement clinker for use in the manufacture of Portland cement can be incorporated into the clinker or the final reactant mixture. The present invention will be described primarily in relation to a Portland cement for which the substantially dry, unprocessed aragonite is employed as the calcareous material in combination with an argillaceous material, such as clay, clay-kaolin mixture, slag, fly ash and mixtures of same. The argillaceous material and other materials can be ground to a fineness heretofore required.

The term "substantially dry, naturally recovered, unprocessed aragonite", as used herein is to be understood to mean the aragonite as recovered from the ocean floor by dredging or other operations which includes varying fineness of material. Further, such material when stored will normally contain up to about 9 percent moisture. Thus, the term "unprocessed" as used herein, means no further treatment to the aragonite after its recovery from the ocean floor other than the mere handling of same to transport it to a stock pile and then to the rotary kiln wherein the desired Portland cement clinker is to be made.

In producing Portland cement clinker using substantially dry, naturally recovered, unprocessed aragonite, as the calcareous material along with groun argillaceous and other materials, a raw kiln feed is formed consisting typically of from about 70 to about 80 weight percent solid content of the aragonite and from about 30 to about 20 weight percent solids content of the argillaceous materials (these ratios can change, depending upon the calcium content of the argillaceous materials that are used). The raw feed is then put into the feed end of the kiln and progresses down the kiln toward the burning zone of the kiln. As the material moves down the kiln the change from aragonite to calcite occurs and the calcite further breaks down from calcium carbonate to calcium oxide and carbon dioxide. The calcined material and the argillaceous fraction through a combination of physical and chemical processes form the necessary clinker compounds, the last of which are formed in the burning zone. The burning zone temperatures at which the Portland cement clinker is manufactured are in the general range of from 2650° F to 2800° F. This temperature range is a general guideline and can, of course, be varied depending upon the raw materials used and the final clinker quality desired. When operating in accordance with the subject invention, there should be enough length of kiln between the point that the aragonite reverts to calcite and the upper end (start) of the burning zone, to allow the mechanical action of tumbling to break up the calcite particles into a size that will readily combine chemically with the other components of the raw mix. When employing the before described aragonite as the calcium carbonate constituent in a cement kiln feed, one can readily produce a Portland cement clinker having an uncombined (free) lime content of less than about 2 percent such as determined by ASTM procedure C-114. The free-lime content of the cement clinker is used in the cement industry as a guideline for the production of acceptable Portland cement. For example, a clinker or a ground clinker, (excluding gypsum content) should contain an average of less than about 2 percent by weight uncombined (free) lime (CaO), preferably less than about 1.5 percent by weight uncombined (free) lime in a water quenched clinker. More than 2 percent by weight free-lime in the final product could detrimentally affect the soundness properties of the Portland cement produced from such clinker.

In practicing the present invention, the aragonite is employed in a substantially dry, unprocessed state and can be combined with an argillaceous material which can be present in either a dry state or in an aqueous slurry. When the argillaceous materials are present in an aqueous slurry, the amount of slurry employed to form the raw kiln feed with the aragonite should be such that the resulting raw kiln feed contains from about 15 to about 30 weight percent water. One useful method of producing cement clinker is using unprocessed aragonite in combination with an aqueous slurry containing the preground and blended argillaceous material having the desired solids content. This slurry along with unprocessed aragonite is fed into the kiln feed spout at predetermined rates, so that the proper amounts of each of the required elements enter the feed spout. No mixing between the slurry and unprocessed aragonite occurs except that which is inherent in the course of two (or more) materials moving together though a common pipe. The two (or more) materials so introduced into the kiln are mixed further due to the mechanical movement of the kiln and progress down the kiln to the burning zone where the final step of the burning process occurs, and the desired cement clinker is formed.

Another approach for producing Portland cement clinker using the substantially dry, naturally recovered, unprocessed aragonite as the calcium carbonate constituent of the cement clinker is to introduce the aragonite and the aqueous slurry containing the argillaceous material into the kiln as separate streams. However, in order to maintain the proper chemical ratio of aragonite to argillaceous material within the clinker so produced, the two ingredients are introduced substantially simultaneously at predetermined rates which are sufficient to produce, in situ, the desired raw kiln feed and thus, the desired resulting Portland cement clinker.

Thus, by practicing the process of the subject invention whereby Portland cement is manufactured without the necessity of grinding the calcareous material prior to its introduction into the kiln and without the necessity of blending the argillaceous and calcareous materials prior to the time they are introduced into the kiln, one can effect an electrical energy savings of about two-thirds of that required in the conventional process for preparing kiln feed in the manufacture of Portland cement.

Still another approach for producing cement clinker using substantially dry, naturally recovered, unprocessed aragonite as the calcium carbonate constituent in the production of cement clinker is to form a raw kiln feed consisting typically of from about 70 to about 80 weight percent solids content of the substantially dry, naturally recovered, unprocessed aragonite and from about 30 to about 20 weight percent of substantially dry argillaceous materials, and thereafter, burning the resulting raw kiln feed in the burning zone of a kiln to produce the desired Portland cement clinker having a free-lime content of less than about 2 percent. When employing argillaceous materials in a substantially dry state, one method for producing the clinker according to the process of the present invention is to form a kiln feed by placing both, the aragonite and dry argillaceous materials, into a common feed spout going to the kiln.

As previously stated, when employing the argillaceous material in its substantially dry state, the argillaceous material is preferably ground to the degree of fineness as required. Thereafter, the ground particles of the argillaceous material are conveyed by any suitable means to the kiln. The aragonite and argillaceous material are introduced into the kiln together through a common pipe. Upon introduction of the feed into the kiln, the dry argillaceous material and the aragonite are mixed, in situ, and the desired Portland cement clinker is so produced.

Another approach to employing a substantially dry argillaceous material with substantially dry aragonite to produce Portland cement clinker in accordance with the present invention, is to introduce the argillaceous material and the aragonite into the kiln separately but yet substantially simultaneous to produce, in situ, the raw kiln feed. When the argillaceous material and the aragonite are introduced into the kiln, care should be exercised, whether employing a single feed stream or introducing the two components separately, to maintain the desired ratio of aragonite to the argillaceous material within the kiln. Such proportioning can readily be achieved by predetermining the rate of introduction of each of the components based on their chemistry, into the kiln and thus the burning zone and by controlling the chemical balance of the components to produce the desired chemical composition of clinker.

For a better understanding of the present invention the following example is presented. However, it is to be understood that the example is for illustrative purposes only and is not intended to unduly limit the scope of the present invention as set forth in the appended claims.

EXAMPLE

In a cement plant, Portland cement was produced using substantially dry, naturally recovered, unprocessed aragonite as the calcium carbonate constituent. The aragonite employed was as received from the supplier and it had been stockpiled at the plant site.

The aragonite was fed in its substantially dry, unprocessed, unslurried state directly into the kiln feed spout in a predetermined amount to produce about 75 tons of clinker per hour. The aragonite was handled in the following manner:

A front end loader moved the unprocessed aragonite from the stockpile and positioned it in a receiving hopper. The aragonite was withdrawn from the hopper by a variable speed belt conveyor. The variable speed belt conveyor moved the aragonite to a bucket elevator, which discharged the aragonite onto a second belt conveyor which was equipped with a weighing section. The weighing section automatically controls the speed of the first conveyor belt to provide a constant, predetermined mass flow of aragonite into the kiln. The aragonite carried by the second conveyor belt was discharged directly into the feed spout of the kiln together with argillaceous slurry comprising water, clay, kaolin and slag, such being predetermined by the mix design. The slurry was produced in the conventional manner using a wash mill-ball mill blending tank circuit. The amounts of the aragonite and the slurry used were those required to produce a Type I Portland cement clinker.

The experiment was conducted using full scale plant equipment. The flow of the slurry was adjusted using either a control valve to regulate the volume of the slurry or a control valve/nuclear density gauge system which provided a constant mass flow of the slurry into the kiln. The feed rates of the substantially dry aragonite and slurry were thus predetermined and controlled automatically.

The aragonite and slurry were then introduced into the kiln where the described action within the feed pipe and inside the kiln mixed the two ingredients. The amount of water in the resulting raw kiln feed was about 29 percent of weight. The material moved down the kiln as previously described.

The kiln was fired by pulverized coal and a burning zone temperature of about 2700° F to about 2750° F was maintained within the kiln. The substantially unblended feed stream containing the unprocessed aragonite and the slurry were fed into the kiln, and, as previously stated, mixed, in situ, within the kiln prior to burning. The burn was successful. The clinker formed easily and was air quenched. The feed end temperature remained constant at about 540° F. Free lime contents of less than about 2 percent were obtained as tested on samples of the Portland cement clinker so produced.

Samples of the resulting clinker were drawn each hour during the run. The clinker was analyzed for chemical components using an X-ray analyzer, the free lime determination of the clinker was determined by titration in accordance with ASTM procedure C-114 and the clinker mineral components were computed. Table I contains a typical analysis of the clinker obtained during a continuous 12 hour period.

TABLE I

| SAMPLING PERIOD (HOURS) | CLINKER CHEMICAL COMPONENTS (%) | | | | | CLINKER MINERAL COMPONENTS (%) | | | |
|---|---|---|---|---|---|---|---|---|---|
| | $SiO_2$ | $Al_2O_3$ | $Fe_2O_3$ | CaO | Free CaO | $C_3S$ | $C_2S$ | $C_3A$ | $C_4AF$ |
| 1 | 21.6 | 6.0 | 3.2 | 65.3 | 0.81 | 56.5 | 19.4 | 10.5 | 9.7 |
| 2 | 20.7 | 5.6 | 2.8 | 67.3 | 2.00 | 74.8 | 3.0 | 10.1 | 8.5 |
| 3 | 21.2 | 5.7 | 2.9 | 66.7 | 0.76 | 67.7 | 9.8 | 10.2 | 8.8 |
| 4 | 22.2 | 5.8 | 3.1 | 65.3 | 0.76 | 53.4 | 23.4 | 10.1 | 9.4 |
| 5 | 20.3 | 6.0 | 3.0 | 67.0 | 1.24 | 73.6 | 2.7 | 10.8 | 9.1 |
| 6 | 21.0 | 5.9 | 3.2 | 66.3 | 0.65 | 65.8 | 10.6 | 10.2 | 9.7 |
| 7 | 20.9 | 5.8 | 3.2 | 66.3 | 1.13 | 67.3 | 9.2 | 10.0 | 9.7 |
| 8 | 21.6 | 6.1 | 3.2 | 65.3 | 0.54 | 55.8 | 19.9 | 10.8 | 9.7 |
| 9 | 21.8 | 6.1 | 3.0 | 64.9 | 2.00 | 53.0 | 22.6 | 11.1 | 9.7 |
| 10 | 20.4 | 5.9 | 2.8 | 67.3 | 2.00 | 75.0 | 2.0 | 10.9 | 8.5 |
| 11 | 20.6 | 5.9 | 2.9 | 67.2 | 1.40 | 73.0 | 4.1 | 10.7 | 8.8 |
| 12 | 20.9 | 6.0 | 3.9 | 66.7 | 1.40 | 68.0 | 8.7 | 11.0 | 8.1 |

The above tabulated data is well within the accepted ranges for manufacturing standards for high strengths Type I Portland cement clinker. The clinker produced according to the procedure set forth above was ground and admixed with ground gypsum to produce a Type I Portland cement. The resulting cement was analyzed as to chemical components. The components and percentages present in the cement are tabulated in Table II.

TABLE II
ANALYSIS OF CEMENT

| CHEMICAL COMPOSITION | PERCENT |
|---|---|
| $SiO_2$ | 20.1 |
| $Al_2O_3$ | 5.4 |
| $Fe_2O_3$ | 2.8 |
| CaO | 63.8 |
| MgO | 1.1 |
| $SO_3$ | 2.4 |
| Ign. Loss | 1.0 |
| Free CaO | 1.56 |
| Expansion | 0.17 |
| $C_3S$ | 59.2 |
| $C_2S$ | 12.9 |
| $C_3A$ | 9.6 |
| $C_4AF$ | 8.5 |

The resulting cement, which had a Blaine fineness of 3843 cm²/g was then tested for compressive strengths using ASTM Method C109-73. The results of such strength tests are set forth in Table III.

TABLE III

| Age of Cement psi | 1 day 1570 | 3 days 2960 | 7 days 4280 | 28 days 5800 |
|---|---|---|---|---|

The above data clearly shows the production of Type I Portland cement having acceptable chemical and physical properties using unprocessed, unslurried, substantially dry aragonite in accordance with the present invention. Furthermore, this example illustrates that a substantial energy savings is effected by the practice of the subject invention. In addition to the substantial savings of electrical energy which resulted by omission of the conventional steps of grinding the calcareous material and blending of the argillaceous and calcareous materials prior to introduction in the kiln, a substantial savings in thermal energy was also effected. More specifically, the conventional method of grinding and blending the raw materials before the kiln feed spout requires 38 percent moisture in the kiln feed. In the above example, argillaceous slurry plus unground aragonite resulted in 29 percent moisture in the kiln feed. This moisture reduction of 9 percent resulted in a fuel savings of 800,000 BTU per ton of clinker.

We claim:

1. An improved process for producing Portland cement clinker using aragonite as the calcium carbonate constituent comprising:
   a. forming a raw kiln feed consisting essentially of substantially dry, naturally recovered, unprocessed aragonite and an argillaceous material; chemically balanced to produce Portland cement clinker and
   b. burning said raw kiln feed within a rotary kiln to produce a Portland cement clinker having a free-lime content of less than about 2%.

2. The improved process of claim 1 wherein said argillaceous materials are present in an aqueous slurry.

3. The improved process of claim 2 wherein said aqueous slurry containing said argillaceous material and said aragonite are introduced into said kiln simultaneously to chemically balance the mix, said raw kiln feed consisting of said slurry and said aragonite are mixed, in situ, within said kiln during the burning of same.

4. The improved process of claim 2 wherein the aqueous slurry and the substantially dry, naturally recovered, unprocessed aragonite are not admixed together prior to entry into the kiln.

5. The improved process of claim 4 wherein said aqueous slurry containing said argillaceous material and said aragonite are introduced into said kiln simultaneously to chemically balance the mix, said raw kiln feed consisting of said slurry and said aragonite are mixed, in situ, within said kiln during the burning of same.

6. The improved process of claim 2 wherein said slurry and said aragonite are introduced separately but substantially simultaneously into said kiln at rates sufficient to produce, in situ, said raw kiln feed, chemically balanced to produce Portland cement clinker.

7. The improved process of claim 1 wherein said argillaceous material is employed in a substantially dry state.

8. The improved process of claim 7 wherein the dry argillaceous material and the substantially dry, naturally recovered, unprocessed aragonite are not admixed together prior to entry into the kiln.

9. The improved process of claim 7 wherein said argillaceous material and said aragonite are introduced into said kiln simultaneously to chemically balance the mix, said raw kiln feed consisting substantially of said aragonite, and said argillaceous material, are mixed, in situ, within said kiln during the burning of same.

10. The improved process of claim 8 wherein said argillaceous material and said aragonite are introduced into said kiln simultaneously to chemically balance the mix, said raw kiln feed consisting substantially of said aragonite, and said argillaceous material, are mixed, in situ, within said kiln during the burning of same.

11. The improved process of claim 7 wherein said argillaceous material and said aragonite are introduced separately but substantially simultaneously into said kiln at rates sufficient to produce, in situ, said raw kiln feed, chemically balanced to produce Portland cement clinker.

12. The improved process of claim 8 wherein said argillaceous material and said aragonite are introduced separately but substantially simultaneously into said kiln at rates sufficient to produce, in situ, said raw kiln feed, chemically balanced to produce Portland cement clinker.

* * * * *